(12) United States Patent
Gandhi et al.

(10) Patent No.: US 10,084,502 B2
(45) Date of Patent: *Sep. 25, 2018

(54) ELECTRONIC DEVICE CASE WITH A FRICTION SURFACE

(71) Applicant: Fellowes, Inc., Itasca, IL (US)

(72) Inventors: Harsh Gandhi, Carol Stream, IL (US); Taiwon Choi, Glenview, IL (US); Michael Schmidt, Chicago, IL (US)

(73) Assignee: FELLOWES, INC., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,867

(22) Filed: Nov. 9, 2017

(65) Prior Publication Data

US 2018/0069586 A1 Mar. 8, 2018

Related U.S. Application Data

(63) Continuation of application No. 15/337,518, filed on Oct. 28, 2016, now Pat. No. 9,853,674, which is a
(Continued)

(51) Int. Cl.
| H04B 1/08 | (2006.01) |
| H04B 1/3888 | (2015.01) |
| H04M 1/02 | (2006.01) |

(52) U.S. Cl.
CPC ........ *H04B 1/3888* (2013.01); *H04M 1/0202* (2013.01); *H04M 1/026* (2013.01)

(58) Field of Classification Search
USPC .................. 455/575.1–575.9, 128, 347–351
See application file for complete search history.

(56) References Cited

U.S. PATENT DOCUMENTS

| 8,204,561 B2 * | 6/2012 | Mongan ................. A45C 11/00 |
| | | 206/592 |
| 8,251,210 B2 * | 8/2012 | Schmidt ................. H04M 1/04 |
| | | 206/320 |

(Continued)

OTHER PUBLICATIONS

Ottterbox Commuter Series Case Document 1, http://demandware.edgesuite.net/aaez_prd/on/demandware.static/Sites-otterbox_us-Site/Sites-masterCatalog_OtterBox/default/v1403162741854/pdfs/apl4-i4sun-info.pdf, Downloaded Jul. 9, 2014.
(Continued)

*Primary Examiner* — Edward Urban
*Assistant Examiner* — Rui Hu
(74) *Attorney, Agent, or Firm* — Pillsbury Winthrop Shaw Pittman LLP

(57) ABSTRACT

A case for use with an electronic device includes a base portion with side portions extending therefrom forming a pocket. The case also includes a first material generally at an exterior of the pocket, forming a majority of an exterior surface of the base portion, and a second material secured to and having a higher coefficient of friction than the first material, generally at an interior of the pocket. The second material protrudes through aperture(s) in the first material at the base portion to protrude from the interior to the exterior of the base portion, and outward from the first material such that the second material contacts a support surface when the base portion is placed thereon. The protruding second material extends away from the aperture(s) on opposing surfaces of the first material at the exterior and interior of the pocket to provide securement between the first and second materials.

25 Claims, 10 Drawing Sheets

Related U.S. Application Data continuation of application No. 14/174,436, filed on Feb. 6, 2014, now Pat. No. 9,521,220.

(60) Provisional application No. 61/761,556, filed on Feb. 6, 2013.

(56) References Cited

U.S. PATENT DOCUMENTS

| | | | | |
|---|---|---|---|---|
| 8,428,664 | B1* | 4/2013 | Wyers | F16M 13/04 455/575.1 |
| 8,443,971 | B1* | 5/2013 | Green | A45C 11/00 206/320 |
| 8,708,151 | B2* | 4/2014 | Whitten | G06F 1/1656 206/701 |
| 9,124,350 | B2* | 9/2015 | Biancamano | H04B 1/3888 |
| 9,223,346 | B2* | 12/2015 | Wilson | H04B 1/3888 |
| 9,411,367 | B2* | 8/2016 | Johnson | H04M 1/185 |
| 9,521,220 | B2* | 12/2016 | Gandhi | H04B 1/3888 |
| 9,853,674 | B2* | 12/2017 | Gandhi | H04B 1/3888 |
| 2010/0142126 | A1* | 6/2010 | Dearden | A45F 5/00 361/679.01 |
| 2011/0204758 | A1* | 8/2011 | Loncar | A45C 11/00 312/223.1 |
| 2011/0228459 | A1* | 9/2011 | Richardson | H04M 1/185 361/679.01 |
| 2011/0229671 | A1* | 9/2011 | Chen | A45C 11/00 428/36.8 |
| 2011/0297578 | A1* | 12/2011 | Stiehl | B29C 45/1676 206/701 |
| 2012/0168056 | A1* | 7/2012 | Antonini | B32B 3/00 156/67 |
| 2012/0168336 | A1* | 7/2012 | Schmidt | H04M 1/04 206/478 |
| 2012/0261289 | A1* | 10/2012 | Wyner | A45C 11/00 206/320 |
| 2012/0325720 | A1* | 12/2012 | Tages | H04B 1/3888 206/522 |
| 2013/0296004 | A1* | 11/2013 | Tages | H05K 5/03 455/575.8 |
| 2014/0091689 | A1* | 4/2014 | Mishan | H05K 5/02 312/237 |
| 2014/0378193 | A1* | 12/2014 | Biancamano | H04B 1/3888 455/575.8 |
| 2015/0156900 | A1* | 6/2015 | Yeh | H04B 1/3888 312/223.1 |
| 2016/0043763 | A1* | 2/2016 | Richter | H04B 1/3888 455/575.8 |
| 2016/0058145 | A1* | 3/2016 | Whitten | A45C 11/00 224/191 |

OTHER PUBLICATIONS

Ottterbox Commuter Series Case Document 2, hftp://www.otterbox.com/iPhone-4-/-4S-Commuter-Series-Case/APL4-I4SUN,default,pd.html, Downloaded Jul. 9, 2014.
Ballistic Shell Gel (SG) Series Case, http://www.amazon.com/Ballistic-Shell-Series-Case-iPhone/dp/B0070Y0UC2, Downloaded Jul. 9, 2014.
Ballistic Hard Core (HC) Series Case, 2014, https://www.goballisticcase.com/shop/apple/iphone-44s/hard_core/#.U6LjOrHD_Gg, Downloaded Jul. 9, 2014.
Ottterbox Rugged Defender Series Case Document 1, http://www.otterbox.com/iPhone-4/4S-Defender-Series-Build-Your-Own-Case/apl2-iphone-4s-set,default,pd.html, Downloaded Jul. 9, 2014.
Ottterbox Rugged Defender Series Case Document 2, http://demandware.edgesuite.net/aaez_prd/on/demandware.static/Sites-otterbox_us-Site/Sites-masterCatalog_OtterBox/default/v1403162741854/pdfs/apl2-i4sun-info.pdf, Downloaded Jul. 9, 2014.
Apple iPhone 4 Bumper (Green), 2014, http://store.apple.com/us/product/MC671ZM/B/apple-iphone-4-bumper-green, , Downloaded Jul. 9, 2014.
Apple iPhone 4 Bumper (White), 2014, http://store.apple.com/us/product/MC668ZM/B/apple-iphone-4-bumper-white, Downloaded Jul. 9, 2014.
Skullcandy GridLock Phone Cover, http://www.amazon.com/Skullcandy-iPhone-Trace-Gridlock-One-Size/dp/B006BH2HDO, Downloaded Jul. 9, 2014.
Skullcandy Riser Gel Phone Cover, 2014, http://www.skullcandy.com/shop/iphone-4s-riser-grip-case-record-pink, Downloaded Jul. 9, 2014.
Skullcandy Aviator Phone Cover, http://www.amazon.com/Skullcandy-iPhone-Aviator-Chrome-One-Size/dp/B007O0OBAO, , Downloaded Jul. 9, 2014.
AGF Holster & Shield Combo, http://www.amazon.com/Motorola-Admiral-Sprint-Packaging-CHM2967R/dp/B006TGXWSQ, Downloaded Jul. 9, 2014.
Case-Mate Barely There Phone Cover, http://www.case-mate.com/iPhone-4-Cases/Case-Mate-iPhone-4-4S-Barely-There-Cases.asp, Downloaded Jul. 9, 2014.
Case-Mate Pop! Phone Cover, http://www.case-mate.com/iPhone-4-Cases/Case-Mate-iPhone-4-4S-Pop-ID-Cases.asp, Downloaded Jul. 9, 2014.
Body Glove Argyle Phone Cover, http://www.amazon.com/iPhone-resistant-Argyle-Fabric-Purple/dp/tech-data/B006BFNWDU, , Downloaded Jul. 9, 2014.
Body Glove Gentleman Phone Cover, http://www.amazon.com/Body-Glove-Woodgrain-Gentleman-Protective/dp/tech-data/B006BHP8EO, Downloaded Jul. 9, 2014.
Body Glove Fringe Phone Cover, http://www.amazon.com/Body-Glove-Fringe-Snap-On-iPhone/dp/B003WM81HM, Downloaded Jul. 9, 2014.
Body Glove Kickstand Phone Cover, http://smartphonepedia.com/iphone-4s-body-glove-fade-kickstand-case-red.html, Downloaded Jul. 9, 2014.
Body Glove Icon Phone Cover Document 1, http://www.bodyglovemobile.com/cell-phone-cases/apple/iphone-4s/icon-hybrid/?scheme_id=3, Downloaded Jul. 9, 2014.
Body Glove Icon Phone Cover Document 2, http://www.bodyglovemobile.com/styles/fashion-series/icon/#style-details, Downloaded Jul. 9, 2014.
International Preliminary Report on Patentability dated Mar. 6, 2015 in International Application PCT/US2014/015066.
Office Action dated Mar. 28, 2017 in Chinese Application 201480017921.7.

* cited by examiner

ELECTRONIC DEVICE CASE WITH A FRICTION SURFACE

CROSS-REFERENCE TO PRIOR APPLICATION

This application is a continuation of U.S. patent application Ser. No. 15/337,518 filed Oct. 28, 2016, which is a continuation of U.S. patent application Ser. No. 14/174,436 filed Feb. 6, 2014 and claims benefit to U.S. Patent Application 61/761,556 filed Feb. 6, 2013, the contents of which are incorporated herein in their entirety.

BACKGROUND

Field

The present disclosure is generally related to a case for use with a portable electronic device. More specifically, the disclosure relates to a case configured to protect the electronic device from impacts or abrasions.

Background

Some cases for portable electronic devices, such as cellular phones and personal digital assistants (PDAs), for example, have hard exterior surfaces with low coefficients of friction. Such exterior surfaces may facilitate insertion and removal of the case (and electronic device therein) from a user's pocket. Other cases are formed from a softer cushioning material, tending to have a relatively high coefficient of friction, which may provide greater impact protection to the electronic device. Among other things, the present application discloses improvements to cases for electronic devices.

SUMMARY

According to an embodiment, a case for use with a portable electronic device includes a base portion with side portions extending therefrom, the base portion and side portions forming a pocket configured to surround a back and sides of the portable electronic device. The case also includes a first material generally being positioned at an exterior of the pocket, wherein a majority of an exterior surface of the base portion is formed from the first material. The case also includes a second material generally being positioned at an interior of the pocket, the second material protruding through one or more apertures in the first material at the base portion so that portions of the second material protrude from the interior of the pocket to the exterior surface of the base portion, and protrude outward from the first material at the base portion such that when the base portion of the case is placed on the support surface, the second material contacts the support surface. The second material has a higher coefficient of friction than the first material and is secured to the first material. The second material protrudes through the one or more apertures in the first material at the base portion extends away from the one or more apertures on opposing surfaces of the first material at the exterior of the pocket and the interior of the pocket to provide securement between the first and second materials.

Other features and advantages of the present invention will become apparent from the following detailed description, the accompanying drawings, and the appended claims.

BRIEF DESCRIPTION OF THE DRAWINGS

Embodiments will now be described, by way of example only, with reference to the accompanying drawings in which corresponding reference symbols indicate corresponding parts, and in which.

DETAILED DESCRIPTION OF THE ILLUSTRATED EMBODIMENT(S)

Figure 1:
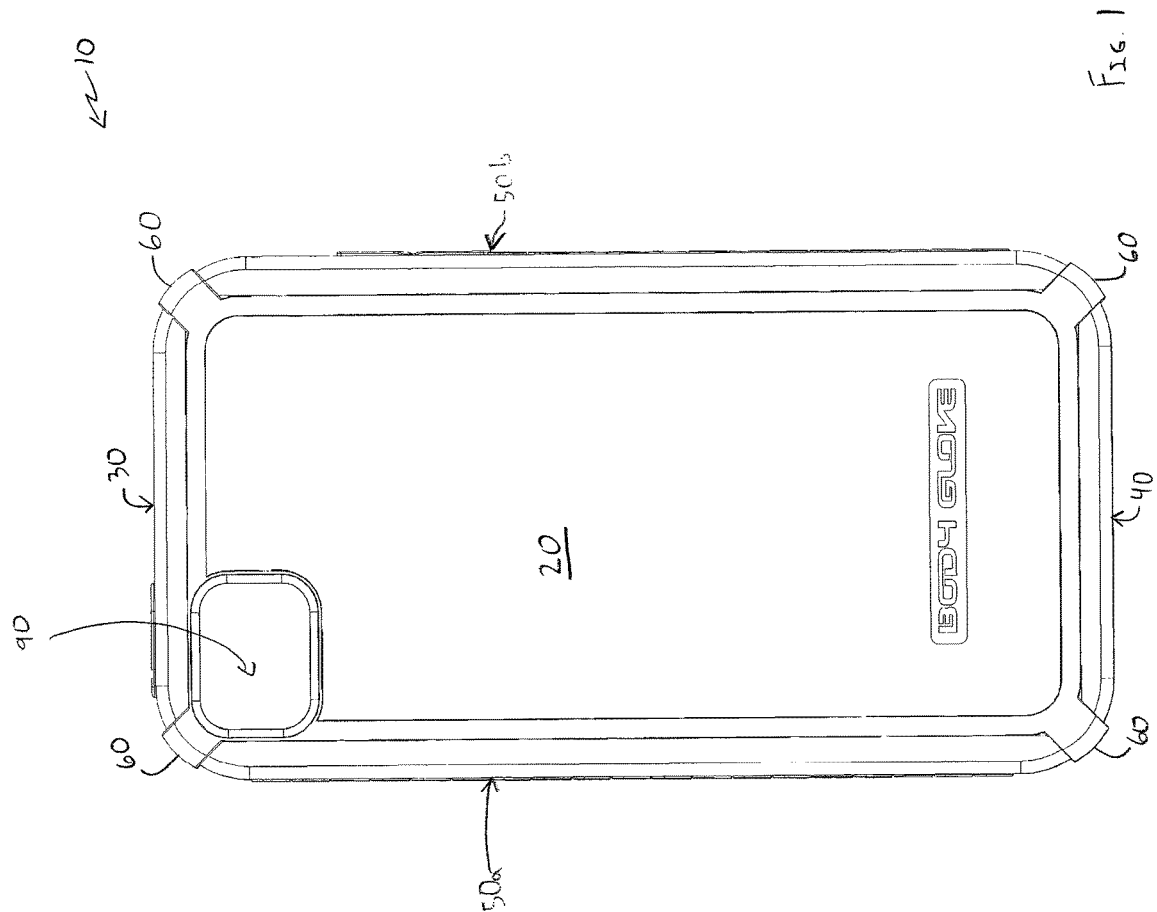
FIG. 1 illustrates a rear view of an embodiment of an electronic device case.

FIG. 1-6 illustrate rear, front, right side, left side, top, and bottom views of a case 10 in accordance with an embodiment of the present invention. FIG. 7 illustrates a perspective view of the case 10. As depicted in FIGS. 1-7, the case 10 includes a base 20 with sides extending away therefrom, forming a pocket to receive a portable electronic device therein. Specifically, in the illustrated embodiment, the case 10 includes a top 30, a bottom 40, a right side 50a, and a left side 50b. It may be appreciated that the so-called right side 50a appears on the left side of FIG. 1 because FIG. 1 illustrates a rear view of the case 10. In an embodiment, the top 30 and bottom 40 may comprise sides of the case 10 that are each coupled to the sides 50a and 50b through corner joints 60, described in greater detail below. It may be appreciated that the case 10 may be configured to house a variety of portable electronic devices across various embodiments, including but not limited to a cellular phone, PDA, music player (e.g., MP3 player), tablet, gaming device, remote control, and the like.

Figure 2:
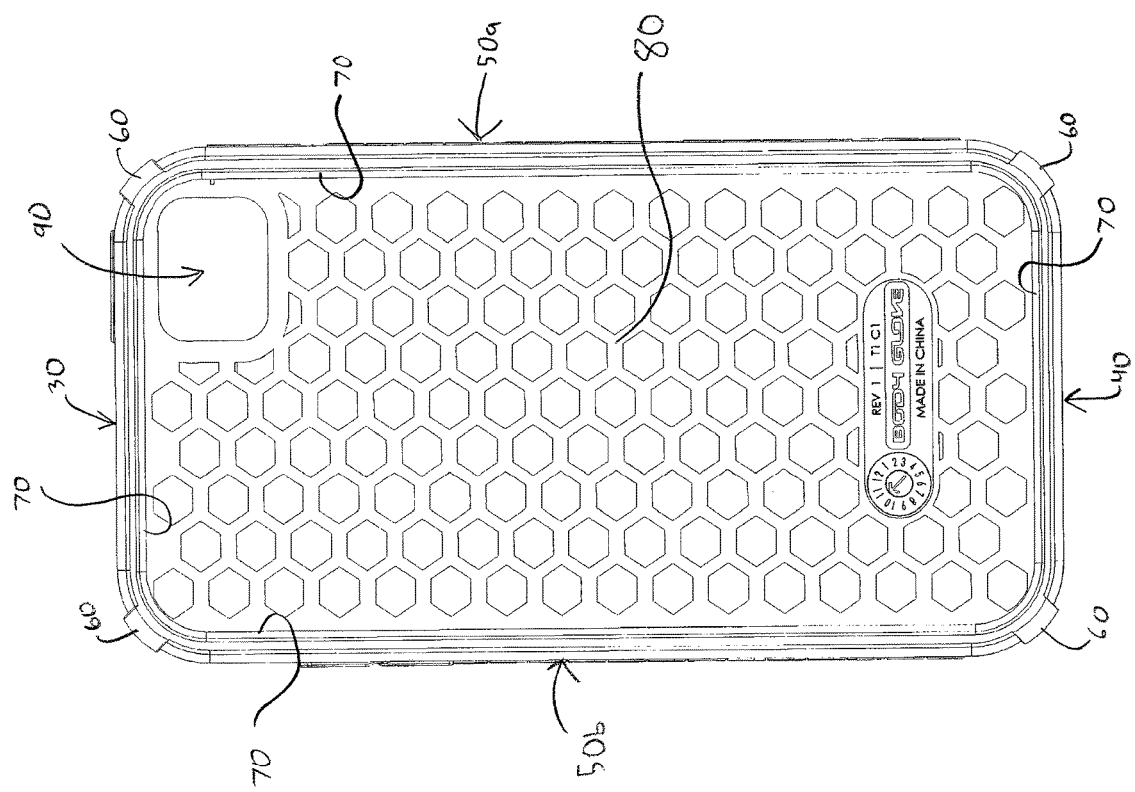
FIG. 2 illustrates a front view of the electronic device case of FIG. 1.

As shown in FIGS. 2 and 7, the top 30, bottom 40, right side 50a, and left side 50b may be coupled by a lip 70 which may surround an opening of the case 10 shaped and configured to receive the portable electronic device therein. It may be appreciated that an interior surface 80 of the base 20, as well as interior surfaces of the top 30, bottom 40, right side 50a, left side 50b, and the lip 70, may define the pocket (with the lip 70 defining the opening of the pocket). In an embodiment, a display screen and/or a user interface of the portable electronic device may face away from the pocket (e.g., may be framed at least partially by the lip 70). As described in greater detail below, the corner joints 60 and/or the lip 70 may be formed of an elastic or otherwise resiliently deformable material, which may facilitate expanding the pocket to receive the portable electronic device within the pocket. It may be appreciated that other configurations of the case 10 may alternatively be possible, including but not limited to cases having multiple components that are separable from each other. For example, slider cases are generally configured with separable pieces that each slide over the portable electronic device, and engage one another (e.g., with a snap fit or friction fit) to secure the portable electronic device therein.

It may be appreciated that the case 10 may have features or apertures formed therein, configured to correspond with features on the portable electronic device. For example, as shown in FIGS. 1 and 2, an aperture 90 may extend through the base 20, and may be configured to align with a camera lens on the electronic device. In some embodiments, the aperture 90 may be sized to additionally or alternatively align with a camera flash on the electronic device. In some embodiments, additional apertures may extend through the base 20, so as to align with other features, including but not limited to marketing insignias on the portable electronic device. It may also be appreciated that in some embodiments one or more of the apertures may be merely decorative (e.g., with a repetitive or randomized pattern of apertures formed across at least a portion of the case 10).

Figure 3:
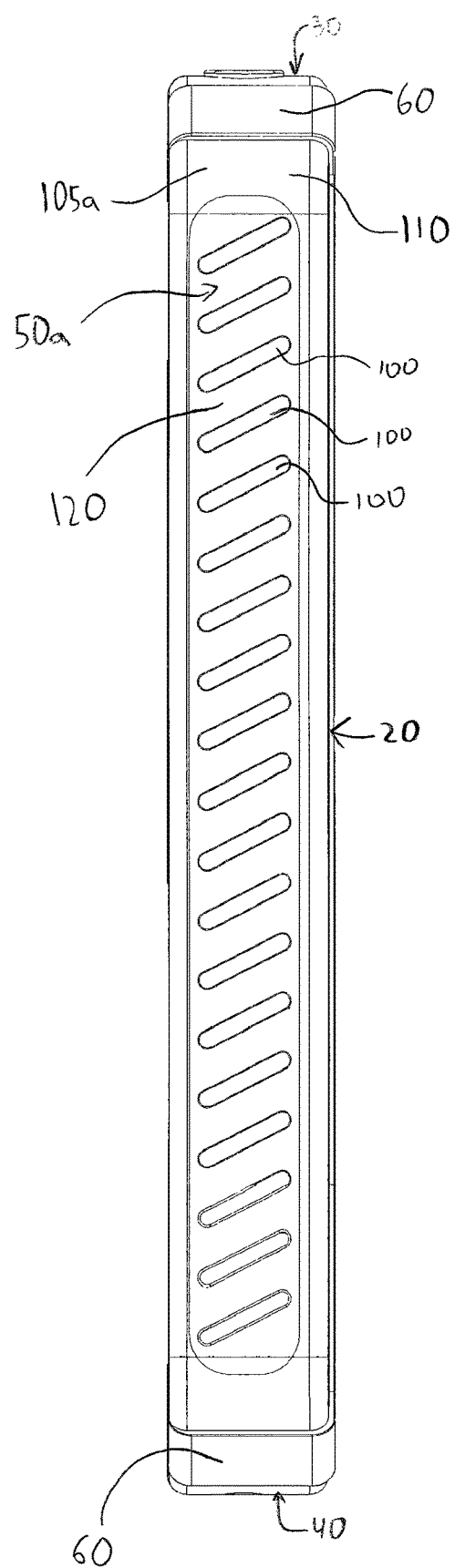
FIG. 3 illustrates a right side view of the electronic device case of FIG. 1.
Figure 4:
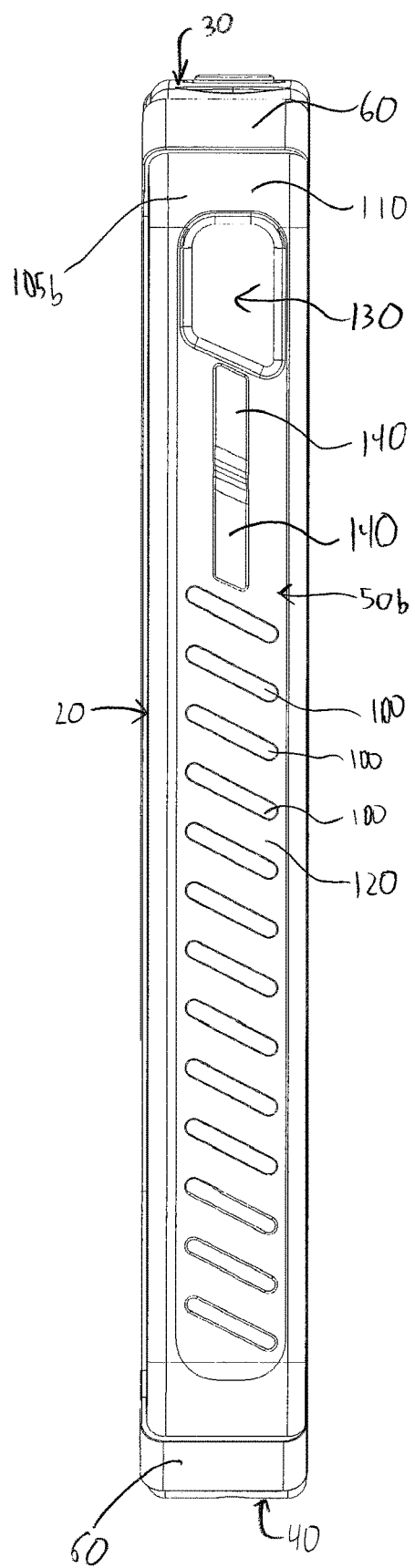
FIG. 4 illustrates a left side view of the electronic device case of FIG. 1.

FIG. 3 illustrates a right side 50a of the case 10. As shown, the right side 50a may include one or more raised features 100 that protrude (e.g., extend outwards) from the remainder of the case 10. As described in greater detail below, in some embodiments the majority of the exterior of the case 10, including at an exterior surface 105a of the right side 50a of the case 10, may generally be formed from a first material 110 while the raised features 100 on the right side 50a of the case 10 may be formed from a second material 120 having a higher coefficient of friction and/or a greater resiliency than the first material 110 generally found at the exterior of the case 10. As shown, in some embodiments the raised features 100 formed of the second material 120 may protrude from a region of the second material 120 that may be generally flush with the first material 110 at the exterior surface 105a of the right side 50a of the case 10. In some embodiments, the second material 120 forming the raised features 100 may be the same material as the material forming the corner joints 60, and/or may have a similar coefficient of friction, higher than that of the first material 110 forming the majority of the exterior of the case 10, and/or may be more resilient than the first material 110. As shown in FIG. 4, illustrating the left side 50b of the case 10, one or more raised features 100 may also be present on the left side 50b of the case 10. Similarly to the right side 50a of the case 10, the raised features 100 may protrude from a region of the second material 120 that may be generally flush with an exterior surface 105b of the left side 50b of the case 10, formed from the first material 110.

Similarly to the aperture 90 extending through the base 20, in some embodiments the left side 50a and/or the right side 50b may contain features or apertures formed therein, configured to correspond with features on the portable electronic device. For example, FIG. 4 illustrates a side aperture 130 extending through the right side 50b of the case 10, which may be configured to correspond with a switch (e.g., a mute switch) on the portable electronic device. As further shown, other features, such as button features 140a and 140b may be formed therein, configured to align with and engage buttons of the portable electronic device. While in some embodiments the button features 140a and 140b may be mechanical buttons coupled within the case 10 to transmit a press thereon into a press of the buttons of the portable electronic device, in other embodiments the button features 140a and 140b may be formed from a flexible material, facilitating depression of the button features 140a and 140b. In an embodiment, the button features 140a and 140b (which may correspond with volume buttons of the portable electronic device) may be formed from the same material as the raised features 100. In an embodiment, the button features 140a and 140b and the raised features 100 may be formed from a quantity of the second material 120 at the right side 50b of the case 10 (e.g., where the second material 120 is flexible).

Figure 5:
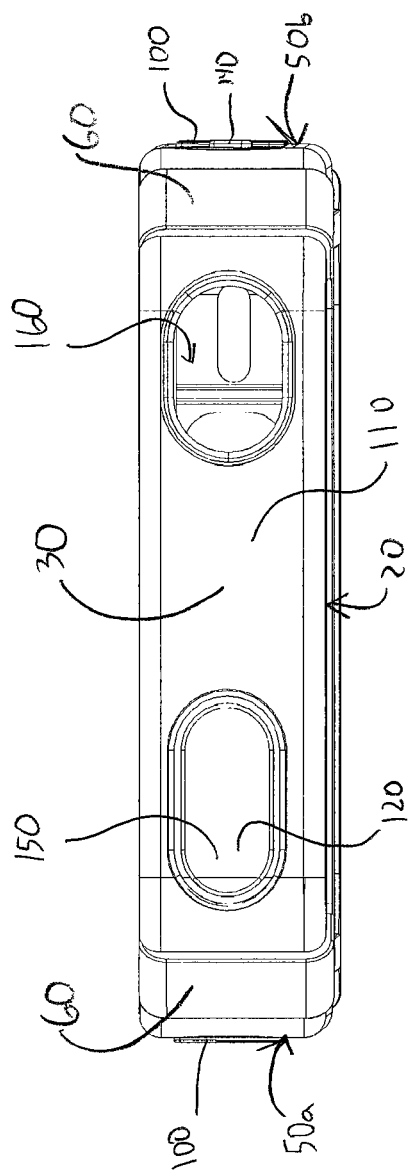
FIG. 5 illustrates a top view of the electronic device case of FIG. 1.

FIG. 5 illustrates a top view of the case 10, showing the top 30. In an embodiment, the top 30 is formed from the first material 110 that forms the majority of the exterior of the case 10 (namely, e.g., the exterior of the base 20). As with other faces of the case 10, it may be appreciated that the top 30 may contain features or apertures formed therein, configured to correspond with features on the portable electronic device. In the illustrated embodiment, the top 10 includes a button 150 and a top aperture 160. In an embodiment, the button 150 may be configured to facilitate actuation of a top button on the portable electronic device. While in some embodiments the button 150 may be a mechanical button assembled into the case 10, in other embodiments, such as that illustrated, the button 150 may be formed from a flexible material configured to deform to allow for depression of the top button of the portable electronic device positioned underneath. In some embodiments, such as that shown, the button 150 may be formed from the second material 120, as described in greater detail below. Similarly to the aperture 90 and the side aperture 130, the top aperture 160 may be configured to align with one or more features of the portable electronic device. For example, in an embodiment the top aperture 160 may be configured to align with an audio jack on the portable electronic device.

Figure 6:
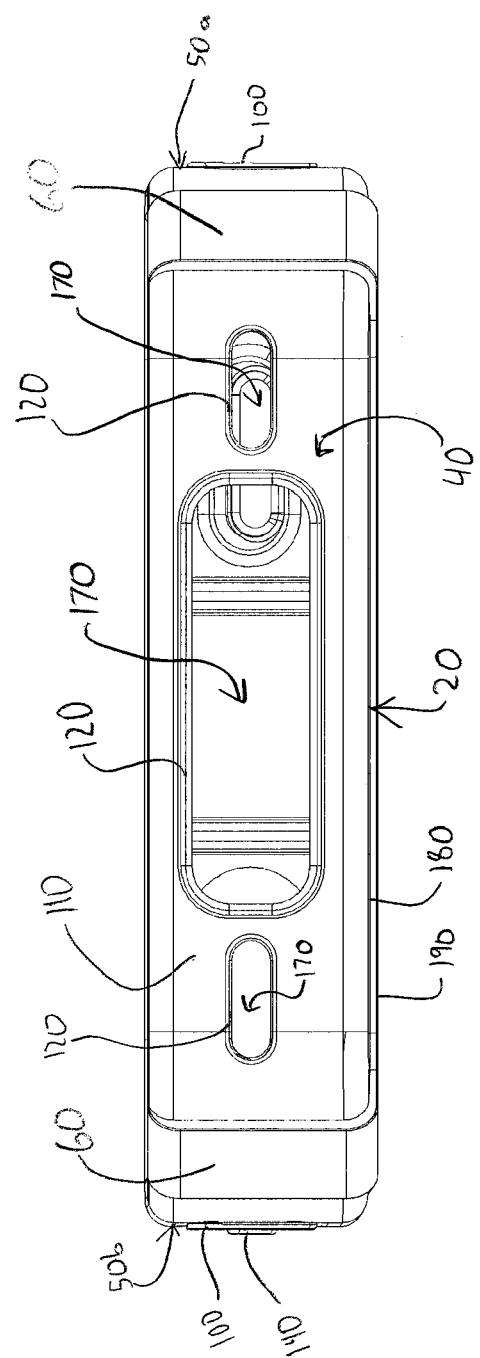
FIG. 6 illustrates a bottom view of the electronic device case of FIG. 1.
Figure 7:
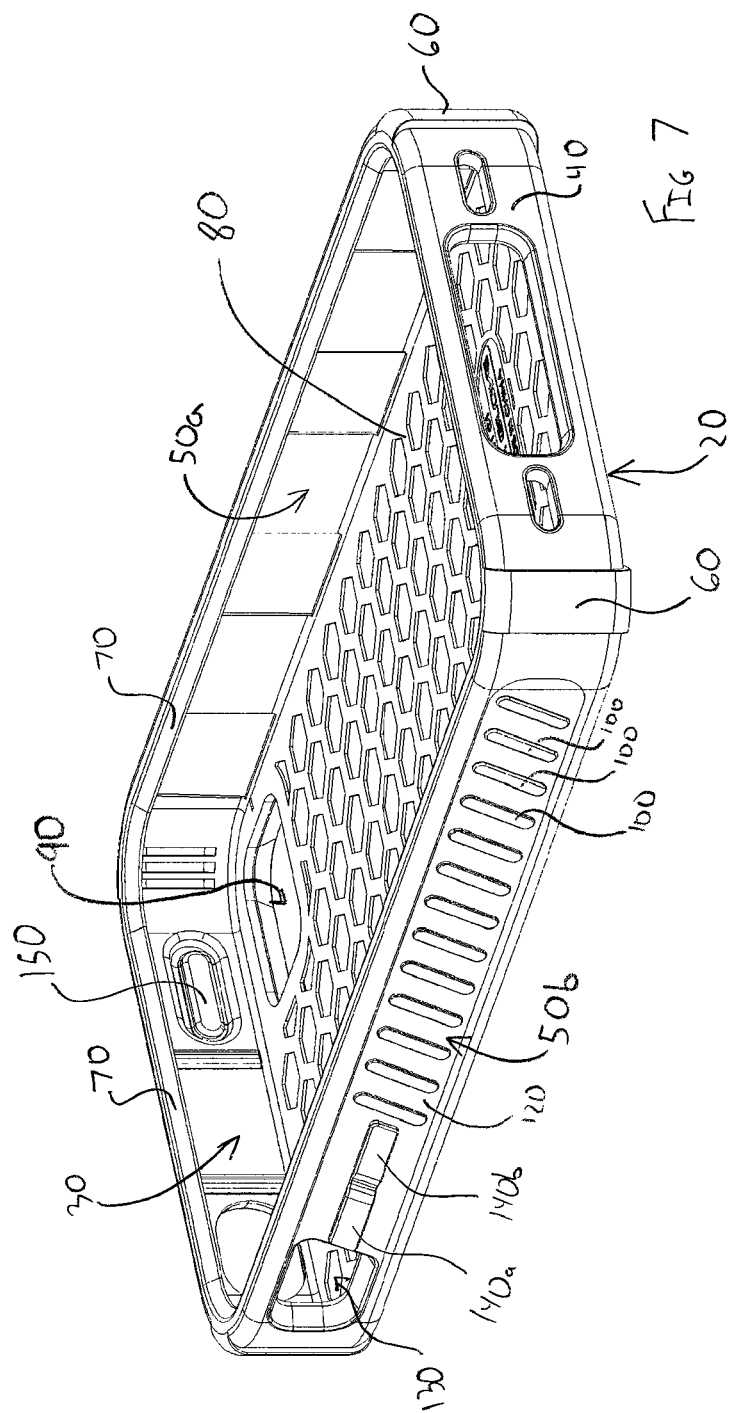
FIG. 7 illustrates a perspective view of the electronic device case of FIG. 1.

As depicted the bottom view of the case 10 in FIG. 6, a bottom 40 of the case 10 may in some embodiments include one or more bottom apertures 170. In the illustrated embodiment, a central bottom aperture 170 may be configured to align with a data port on the portable electronic device, and may be sized and shaped to receive a data cable therein. In an embodiment, other bottom apertures 170 may be configured to align with a speaker and/or a microphone on the portable electronic device. While separate bottom apertures 170 are provided in the illustrated embodiment, in some embodiments the case 10 may include a single bottom aperture 170 shaped to accommodate multiple features on the portable electronic device. In some embodiments, the one or more bottom apertures 170 may be formed directly in the first material 110 forming the majority of the exterior of the case 10. In some embodiments, such as the illustrated embodiments, however, some of the second material 120, or another material, may be positioned within the bottom apertures 170. For example, in the illustrated embodiment, lips surrounding the bottom apertures 170 comprise some of the second material 120.

As appreciated in the views of FIGS. 5 and 6, the raised features 100 protrude from the sides 50a and 50b of the case 10. As such, where the raised features are formed from the second material 120 have a relatively higher coefficient of friction than the first material 110 forming the remainder of the case 10, placing the case 10 on a support surface so that the side 50a or 50b is facing the support surface would cause the higher friction second material 120 to frictionally engage the support surface. Such frictional engagement between the raised features 100 and the support surface may prevent the case 10 from tipping over when placed on its side 50a or 50b, or mitigate a tendency for the case 10 to tip over when the support surface or the case 10 are bumped. Additionally, the raised features 100 at the sides 50a and 50b of the case 10 may serve as a grip for a user of the portable electronic device when the user is holding the portable electronic device.

As further shown in FIGS. 5 and 6, a material having a higher coefficient of friction and/or resiliency than the majority of the exterior of the case 10 may also extend below an exterior surface 180 of the base 20, as a base grip 190. As described in greater detail below, it may be appreciated that in some embodiments, the exterior surface 180 of the base 20 may comprise the majority of the exterior of the case 10, and may be formed from the first material 110. In the illustrated embodiment, the base grip 190 may be formed from the second material 120, having a higher coefficient of friction and/or resiliency than the exterior surface 180. Accordingly, where the exterior of the case 10 is predominantly formed from the first material 110, having a relatively smooth configuration (e.g., a relatively lower coefficient of friction), it may be easier for a user to remove the case 10 from a confined space (e.g., a user's pocket) than if a majority of the exterior of the case 10 was formed from a material having a higher coefficient of friction (e.g., the second material 120). It may be appreciated that where a minority of the exterior of the case 10 has the higher coefficient of friction material (e.g., the second material 120) protruding outward from the material having the lower coefficient of friction (e.g., the first material 110), the higher friction material may provide regions of high friction contact when the case 10 is placed on a support surface. For example, it may therefore be appreciated that when the case 10 is placed on a support surface with the base 20 facing the support surface, and the opening of the pocket of the case 10 (defined by the lip 70) facing away from the support surface, the base grip 190 may contact the support surface, as it protrudes from the lower friction exterior surface 180 of the base 20.

As indicated above, in some embodiments the base grip 190, the raised features 100, and the corner joints 60 may all be formed from the second material 120. In an embodiment, the base grip 190, the corner joints 60, and/or the raised features 100 may all be coupled by the interior surface 80 of the base 20, which may be formed from a layer of the second material 120, positioned to the interior of the first material 110 forming the exterior surface 180. In some such embodiments, features of the case 10 formed from the first material 110 may be interconnected, with features of the case 10 formed from the second material 120 formed onto or integral with the features formed from the first material 110. An example of such a construction may be appreciated in the illustrated embodiment through consideration of FIGS. 7 and 8, where FIG. 8 illustrates a reduced view of the case 10 as depicted in FIG. 7, showing only those features formed from the first material 110, and excluding those features formed from the second material 120.

Figure 8:
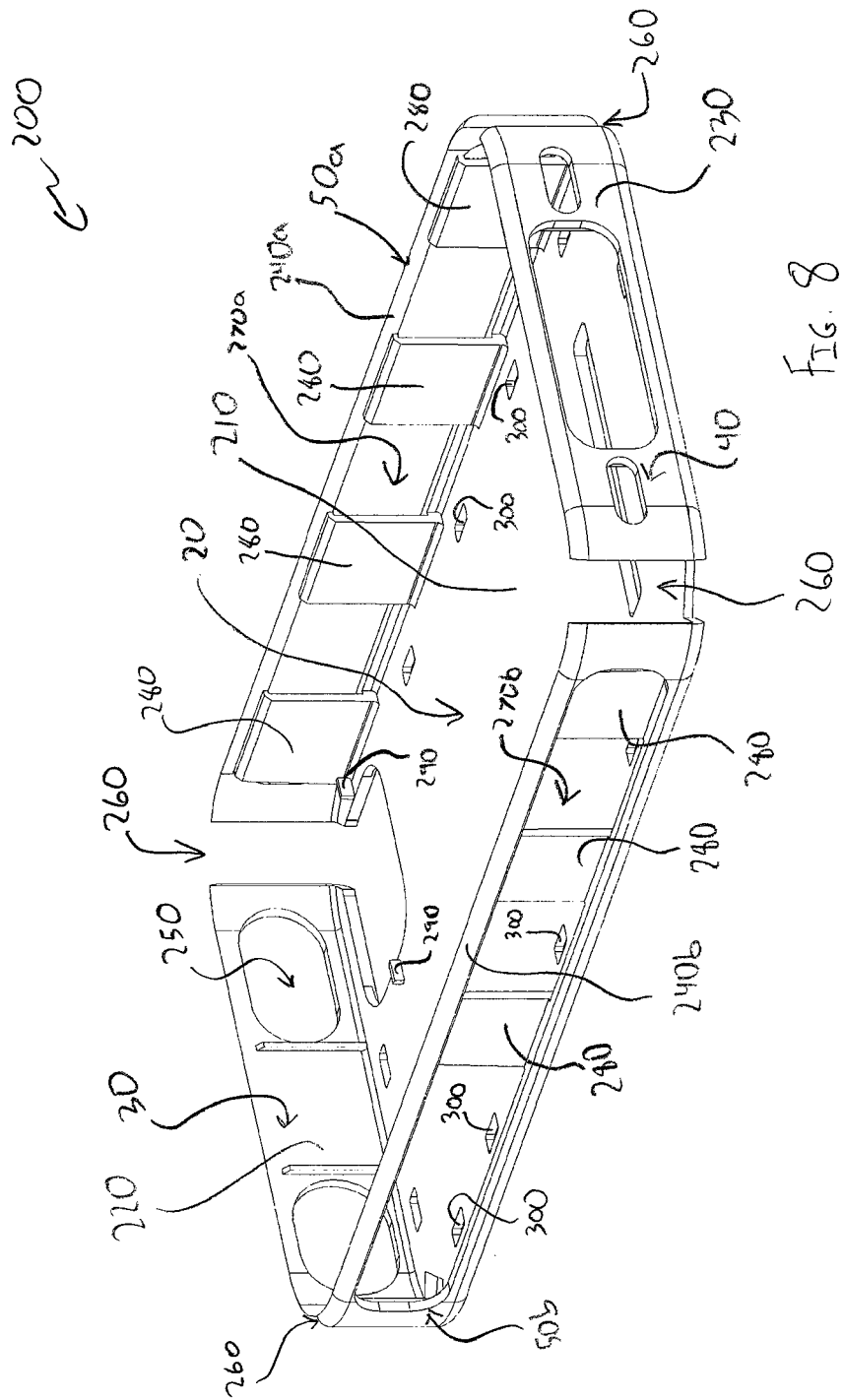
FIG. 8 illustrates a reduced perspective view of the electronic device case of FIG. 1, as depicted in FIG. 7, omitting a material molded therein.

As shown in FIG. 8, a preform member 200 of the case 10 formed from the first material 110 includes a base portion 210 associated with the base 20. It may be appreciated that the exterior surface 180 of the base portion 210 may be the exterior surface of the base 20 as a whole. As shown, the base portion 210 may be coupled to (and in the illustrated embodiment, integral with) a top portion 220 associated with the top 30, a bottom portion 230 associated with the bottom 40, and side portions 240a and 240b associated with the right side 50a and the left side 50b respectively. As shown, the preform member 200 may include apertures formed therein, which may remain unfilled, or may be only partially filled by the second material 120 when assembling the case 10. For example, in the embodiment of FIG. 8, the aperture 90 that extends through the base 20 may be partially filled by the second material 120, while the second material 120 thereat may include the aperture 90 therein, so that the aperture 90 extends through base 20 in the case 10. As further shown, however, the preform member 200 may include some apertures, like a top button aperture 250, which may be completely filled by a molded portion of the second material 120. In the illustrated embodiment, the top button aperture 250 is filled with a molded amount of the second material 120 so as to form the top button 150, which may flex relative to the top portion 220 so as to allow for depression of a button on the portable electronic device.

As additionally shown, in some embodiments gaps 260 may be present at the corners of the preform member 200, which may allow the top 30, bottom 40, and sides 50a and 50b to flex relative to the base portion 210, allowing an area therebetween to expand to facilitate insertion of the portable electronic device. In an embodiment, the preform member 200 as a whole, formed from the first material 110, may be more elastic than the second material 120, and configured to snap back to its original shape after being deformed to allow insertion of the portable electronic device therein. It may be appreciated that the gaps 260 may be filled with the second material 120 to form the corner joints 60. In an embodiment, the second material 120 may be softer than the first material 110, so as to deform with the first material 110 when case 10 is deformed to insert the portable electronic device, but allow for flexibility of the sides of the case 10 at the gaps 260. In some embodiments, the second material 120 may be shaped to protrude out from the gaps 260 defined by the preform member 200, so that the corner joints 60 protrude from the body of the case 10, as illustrated in FIG. 7. It may be appreciated that in some embodiments the corners of the preform member 200 may intersect (e.g., linking the top 30 and/or bottom 40 to either or both of the sides 50a and 50b directly, as well as via the base 20). In some such embodiments, the second material 120 may be formed on top of the intersection, forming corner bumpers that protrude from the corners of the preform member 200.

In some embodiments, the apertures formed in the preform member 200 may be configured to receive a quantity of the second material 120 that may be molded, shaped, or otherwise formed to include various desired features therein. For example, side apertures 270a and 270b, formed in the side portions 240a and 240b respectively, may be configured to receive a mass of the second material 120 which itself may be shaped to include the raised portions 100 and (on the left side 50b of the illustrated embodiment) the button features 140a and 140b. As shown in the illustrated embodiment, the side apertures 270a and 270b may be configured with support ribs 280 that are recessed from the exterior opening of the side apertures 270a and 270b, however provide structural stability to the side portions 240a and 240b. It may be appreciated that in some embodiments the support ribs 280 may be partially or completely covered by the second material 120, as viewed from the exterior of the case 10 and/or from the interior of the pocket. As shown in FIG. 7, in the illustrated embodiment at least some of the second material 120 may fill in spaced between each of the support ribs, as well as filling in the side apertures 270a and 270b. In an embodiment where a side aperture 130 is formed in the second material 120 at the left side 50b, it may be appreciated that a support rib 280 may be omitted thereat. In other embodiments, the side aperture 130 may extend through a support rib 280, or the side aperture 130 may otherwise be positioned between support ribs 280.

While in some embodiments the first material 110 and the second material 120 may be integrally formed together (e.g., through co-injection molding or similar assembly mechanisms to form a one piece embodiment of the case 10), in the illustrated embodiment, the first material 110 may be formed into the preform member 200 first, before being overmolded with the second material 120. While in some embodiments the preform member 200 may be merely partially cured before the second material 120 is applied and molded therearound, in an embodiment the formation of the preform member 200 may be complete (e.g. cured, removed from the mold, and/or separately assembled) before being combined with the second material 120.

Figure 9:
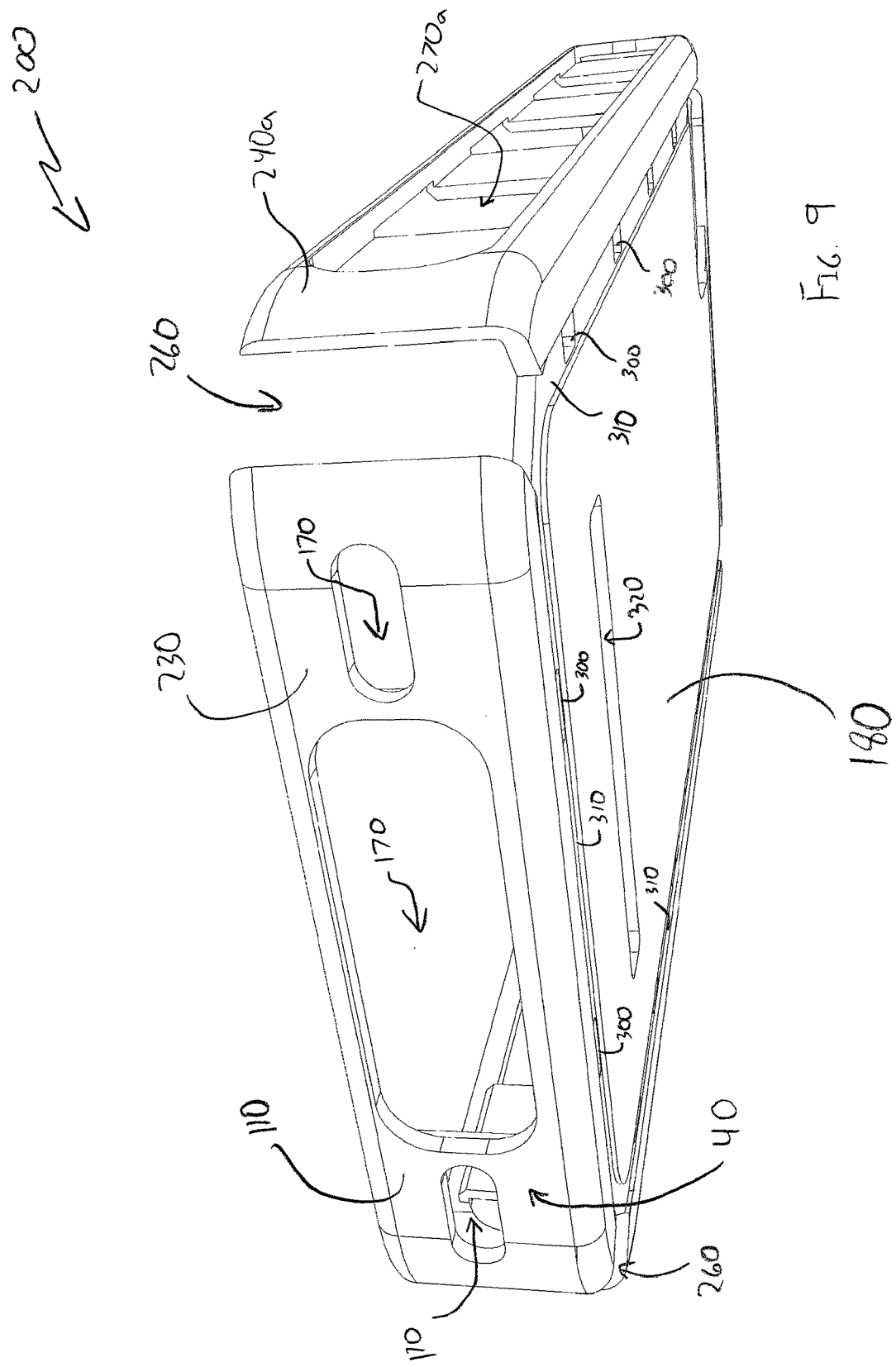
FIG. 9 illustrates another reduced perspective view of the electronic device case of FIG. 1.

In the illustrated embodiment, with the preform member 200 being formed from the first material 110 before application of the second material 120 thereto, it may be appreciated that molding supports may be positioned thereon to facilitate overmolding of the second material 120. In some embodiments the molding supports may be configured to cooperate with the mold in the overmolding process. For example, in an embodiment one or more of the molding supports may be configured to position or align a portion of the mold to facilitate injection of the second material 120. As shown in FIG. 8, in the illustrated embodiment support tabs 290 may be configured to define a maximum application thickness for the overmold of the second material 120 on the interior of the base portion 210 (e.g., for application of the second material 120 to form the interior surface 80 of the case 10). In an embodiment the molding supports may include apertures 300 in the first material 110 which may be configured to facilitate flow of the second material 120 to desired regions of the preform member 200 prior to curing the second material 120. For example, as shown in FIG. 9, illustrating the exterior surface 180 of the preform member 200, the apertures 300 may extend through the base 20. In the illustrated embodiment, one or more base grip grooves 310 may be formed in the exterior surface 180, and may be configured to direct a flow of the second material 120 when poured or injected onto the base portion 210 of the preform member 200, allowing the second material 120 to form the base grips 190 as well as cover the interior surface 80 of the base portion 20.

It may therefore be appreciated that in some embodiments the second material 120 may surround the first material 110, such as by being molded onto opposing faces of the first material 110 (e.g., as the preform member 200), however being connected. It may be appreciated that such a configuration may provide increased structural stability to the case 10. For example, in the illustrated embodiment, the second material 120 may flow through the apertures 300, across the base grip grooves 310, and connect with other portions of the second material 120 before curing. Where the second material 120 coats the interior surface 80 of the base 20, and overlays (and in an embodiment protrudes from) the exterior surface 180 of the base 20, it may be appreciated that the second material 120 may sandwich the first material 110 therebetween. As noted above, in some embodiment the support ribs 280 (formed from the first material 110) may be partially or completely covered by the second material 120. It may be appreciated that the support ribs 280 surrounded by the second material 120 may provide increased structural stability to the sides 50a and 50b of the case 10 in such embodiments.

Figure 10:
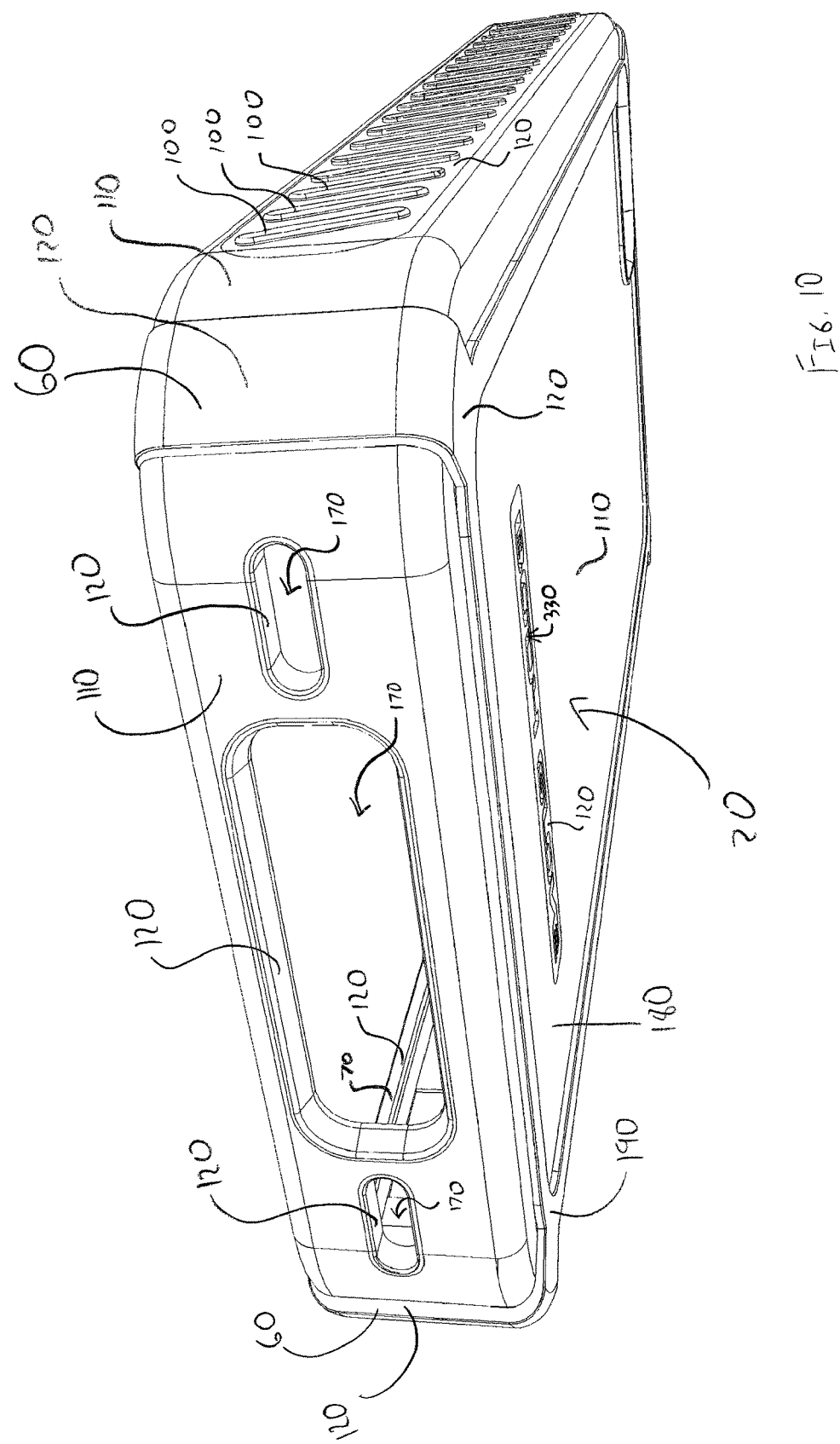
FIG. 10 illustrates a perspective view of the electronic device case of FIG. 1, as depicted in FIG. 9, including the molded material omitted therefrom.

FIG. 10 illustrates a perspective view of an embodiment of the case 10, similar to the view of the preform member 200 in FIG. 9. As shown in the comparison between FIGS. 9 and 10, when the second material 120 is injected or poured onto the preform member 200, the second material 120 may pass through the apertures 300 therein, and traverse the base grip grooves 310 to form the base grips 190. In some embodiments, the molding process may be configured to shape and define an amount by which the base grips 190 extend from the exterior surface 180 of the base 20. For example, in an embodiment the mold may include one or more corresponding grooves that match the base grip grooves 310 of the preform member 200. Accordingly, the shape of the base grips 190 may be defined through a molding process. In an embodiment, the second material 120 protruding through one or more apertures 300 may extend away from the one or more apertures 300 on opposing surfaces of the first material 110 at the exterior surface of the base 20 and the interior surface of the base 20, to provide securement between the first material 110 and the second material 120. In an embodiment, the second material 120 protruding through the one or more apertures 300 in the first material 110 may protrude through adjacent apertures 300, and thus the second material 120 may extend on both the exterior surface of the base 20 and the interior surface of the base 20, as well as in both adjacent apertures 300. In an embodiment the second material 120 protruding through the one or more apertures 300 in the first material 110 may protrude through a plurality of sets of adjacent apertures 300 in the first material 110, and may extend between the adjacent apertures 300 of each set on each opposing surface of the first material 110.

As shown, in some embodiments, the molding or other addition of the second material 120 may be configured to position the second material 120 at the gaps 260 so as to form the corner joints 60. The second material 120 may also form the lips around the bottom apertures 170, as shown, as well as fill the side apertures 270a and 270b. It may be appreciated that in embodiments where the raised features 100 are molded from the second material 120, the mold may include grooves configured to shape the second material 120 to create the raised features 100 protruding from the case 10. It may also be appreciated that, in some embodiments, the second material 120 may additionally form the lips 70 surrounding the opening of the case 10 as the second material 120 is molded onto the preform member 200. It may be appreciated that in some embodiments, the lips 70 may also protrude above the opening of the case 10 (e.g., away from a screen of a portable electronic device inserted within the case 10), which may cause the second material 120 to extend outward from the first material 110 in the case 10 at both of the largest opposing faces of the case 10. In an embodiment, such as that shown, an aperture 320 extending through the base 20 may be configured to be filled with the second material 120, and be molded to depict a marketing insignia 330 therein. Other features formed from the second material 120 may additionally or alternatively be formed from the addition of the second material 120 to the preform member 200. Furthermore, it may be appreciated that the molding or other assembly may be performed simultaneously or sequentially in various embodiments. Accordingly, constructing case 10 by overmolding the second material 120 to the preform member 200 is not intended to be limiting. Indeed, in some embodiments the second material 120 may be formed with recessed regions at exterior surfaces thereof, and one or more harder plates of first material 110 may be molded thereon.

It may be appreciated that the protruding configuration of the corner joints 60, the raised features 100, the base grips 190, and/or the lips 70 may provide a degree of additional protection to the case 10 and a portable electronic device housed therein. For example, where the first material 110 is glossy or otherwise prone to scratching, the protruding second material 120 may space the first material 110 from support surfaces, reducing a likelihood of the first material 110 being scratched by the support surface or debris thereon. Additionally, where the second material is resilient (e.g. soft and/or flexible), the protruding configuration thereof may provide enhanced impact resistance, such as when the case 10 is dropped and impacts a face or corner thereof. For example, if the case 10 is dropped at a corner thereof, the protruding second material 120 at the corner joint 60 may provide enhanced impact resistance, and mitigate a tendency of the first material 110 adjacent to the gap 260 from impacting and cracking. This additional protection may be particularly beneficial where, like in the illustrated embodiment, the first material 110 is positioned to form the majority of the exterior of the case 10. Furthermore, where the second material 120 has a higher coefficient of friction and/or resiliency than the first material 110, it may be appreciated that the protruding amount of the second material 120 may cause the second material 120 to contact a support surface instead of the first material 110, providing a higher frictional engagement between the case 10 and the support surface. As noted above, such a higher frictional engagement may prevent the case 10 from tipping over when placed on one of the sides 50*a* or 50*b* (e.g., through the case 10 and portable electronic device having a high center of gravity in such a position).

As described above, the protrusion of the second material 120 from the first material 110 at the base 20 may provide regions of high friction contact when the case 10 is placed on a support surface. In an embodiment, more than half of the exterior of the base 20 (i.e., the surface outside of the pocket) may be formed from the first material 110, while less than half of the exterior of the base 20 may be formed from the second material 120 protruding outwards from the first material 110, so as to form a surface of the second material 120 that may contact a support surface instead of the first material 110 when the base 20 of the case 10 is resting on the support surface. In other embodiments, the second material 120 forming the surface that contacts a support surface may make up a smaller proportion of the exterior of the base 20. For example, the second material 120 protruding from the first material 110 at the exterior of the base 20 may be approximately less than or equal to 40% of the exterior of the base 20. In other embodiments, the second material 120 protruding from the first material 110 at the exterior of the base 20 may be approximately less than or equal to 30% of the exterior of the base 20, approximately less than or equal to 20% of the exterior of the base 20, approximately less than or equal to 10% of the exterior of the base 20, or approximately less than or equal to 10% (e.g., 5%, 1%, or less) of the exterior of the base 20.

In an embodiment, the amount of the second material 120 protruding out from the first material 110 at the exterior of the base 20 may be just sufficient to support the base 20 thereon, so as to space the first material 110 from a support surface, so that contact between the support surface and the base 20 is via the second material 120 instead of the first material 110. For example, in an embodiment the second material 120 may protrude from the first material 110 at the exterior of the base 20 at least at three regions, so as to provide a stable support of second material 120 when the base 20 is placed against a support surface. In an embodiment, a protruding amount of second material 120 may be positioned at each corner of the base 20 (e.g., adjacent to the corner joints 60), to provide four points of contact for the second material 120 between the base 20 and the support surface. In some embodiments, such as that illustrated herein, the second material 120 may generally form a ring following a perimeter of the base 20 (e.g., following the base grip grooves 310 in some embodiments), surrounding a substantial amount of the first material 110 of the base 20. In an embodiment, the protruding portions of second material 120 may form thin or elongate shapes across the first material 110 of the base 20.

As indicated above, features of the constructions and configurations described herein and illustrated in the Figures may be exemplarity in some embodiments. For example, while in the illustrated embodiment the case 10 is formed from the overmolding of the second material 120 onto the preform member 200, in some embodiments the case 10 may be formed by simultaneously molding the first material 110 and the second material 120. In some such embodiments, the case 10 may be formed using processes such as injection molding. In an embodiment, case 10 is preferably formed from injection-molded plastic. Other constructions are additionally or alternatively possible, including but not limited to creating an assembly through a combination of constituent components, assembled through adhesion with an adhesive, interlocking components, or any other appropriate assembly mechanism.

It may additionally be appreciated that dimensions of the case 10 may vary according to the type of electronic device to be held therein. For example, in some embodiments where the first material 110 (e.g., as the preform member 200) is relatively hard or rigid (especially as compared to the second material 120), it may be appreciated that the dimensions thereof may be sufficient to surround the portable electronic device. In an embodiment, the relatively flexible second material 120 may be sized to snugly surround the portable electronic device, and may provide impact protection for the portable electronic device within the first material 110. Additionally, in some embodiments the first material 110 in the case 10 may be shaped to generally match contours of the portable electronic device. For example, the preform member 200 or analogous components of other embodiments of the case 10 may cause the case 10 to generally resemble the portable electronic device. In some embodiments, the case 10 may be formed with the first material 110 (e.g., as the preform member 200) having multiple facets or curves formed on one or more of the base 20, top 30, bottom 40, right side 50*a*, and left side 50*b*. In other embodiments, the case 10 may be shaped in a manner that is externally different from the portable electronic device configured to be retained therein. In some embodiments, the second material 120 may be configured to create a pocket shaped to retain the portable electronic device, but may have varying thickness within to fill the space between the pocket and the first material 110 at the exterior of the case 10. Accordingly, it may be appreciated that the generally straight lines and rounded corners depicted in the case 10 illustrated herein are merely exemplary.

The materials utilized in the case 10 and/or their properties may also vary across embodiments. For example, while in the illustrated embodiment the first material 110 utilized in the preform member 200 is described as being hard or rigid, in other embodiments the first material 110 may be any appropriate material having less shock absorbing properties than the second material 120. For example, while both the first material 110 and the second material 120 may be flexible in some embodiments, the second material 120 may be more resilient than the first material 110. It may be understood that resilient materials may include materials that can substantially return to its original form after being stretched, moved, bent, or otherwise deformed (within a reasonable tolerance).

It may be appreciated that in the art, resiliency may be measured by a durometer. Shore A durometers generally measure the compressive deformability of softer materials, such as rubbers and softer polyurethanes, while Shore D durometers may measure compressive deformability of harder polyurethanes and softer plastics. Rockwell R durometers typically measure compressive deformability of harder polyurethanes and plastics, ranging from Teflon through phenolic, for example. Accordingly, in some embodiments the second material 120 may have a hardness/resiliency on a scale conventionally measured on a Shore A durometer (e.g., a Shore A durometer value between 20-95), while the first material 110 may have a hardness/resiliency on a scale conventionally measured on a Shore D durometer of 25-85, or on a Rockwell R durometer of 50-150. In an embodiment, the first material 110 may be harder or more rigid so as to provide penetrative protection thereto, distributing impact forces applied thereto throughout the first material 110. The comparative softness and resilience of the second material 120 (e.g., having a Shore A durometer value of less than 90) may absorb shocks therein, and give to prevent direct application of forces to the portable electronic device housed therein. It may be appreciated that in some embodiments hardness/resilience and an associated coefficient of friction may be distinct from a coefficient of friction associated with the material and a given reference surface. For example, some harder materials may have a relatively high coefficient of friction, while some softer/resilient materials may have a relatively lower coefficient of friction. Accordingly, the selection of the first material 110 and the second material 120 may vary across embodiments, depending on a desired protruding resilient portion or a desired portion having a higher coefficient of friction.

As such, the material selections of the first material 110 and the second material 120 may vary, and may each have different properties, including but not limited to differing hardness/resiliency, and differing coefficients of friction. It may be appreciated that in some embodiments, the same material may have different hardness's/resiliencies, or different coefficients of friction (e.g., with a particular support surface) depending on how the material is prepared. Regardless, in some non-limiting embodiments, the second material 120 may comprise a thermoplastic polymer or a thermoplastic elastomer material, such as thermoplastic polyethylene (TPE) or thermoplastic polyurethane (TPU). Any other resilient material, such as silicone, rubber or form, may additionally or alternatively be utilized. In contrast, the first material 110 may be more prone to permanent deformation, including cracking, scratching, shearing, or so on. As one non-limiting example, in the illustrated embodiment, where the first material 110 is a molded plastic, the first material 110 may comprise a thermoplastic, including but not limited to thermoplastics such as polycarbonate, acrylonitrile butadiene styrene (ABS), and polyvinyl chloride (PVC). It may be appreciated that the first material 110 need not be formed from molded plastic, but may comprise any other material, including but not limited to wood, metal, glass, leather, or so on, which may be overmolded with or assembled with a resilient or otherwise impact absorbing second material that protrudes from the first material 110 as described herein.

In some embodiments, the first material 110 and the second material 120 may have different cosmetic properties. For example, in some embodiments, the first material 110 may have glossy characteristics, while the second material 120 may have matte characteristics. In other embodiments, the converse may be true. In some embodiments, the first material 110 and the second material 120 may be different colors. Additionally, in various embodiments, one or more additional materials may be embedded or combined with either or both of the first material 110 and the second material 120, and may serve cosmetic or functional purposes. For example, different portions of the components of the case 10 described above (e.g., different parts of the preform member 200) may be made from different materials, which may be molded or otherwise assembled before being overmolded or otherwise secured to the second material 120 and/or additional materials that protrude from those portions forming the majority of the exterior of the case 10. In an embodiment, the second material 120 and the first material 110 may be secured to each other through a bond (e.g., as in the molding process) or through adhesion (e.g., via an adhesive).

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of this disclosure, as recited in the following claims.

What is claimed is:

1. A case for use with a portable electronic device, the case comprising:
   a base portion with side portions extending therefrom, the base portion and side portions forming a pocket configured to surround a back and sides of the portable electronic device;
   the base portion comprising a first material, wherein a majority of an exterior surface of the base portion is formed from the first material; and
   a second material generally being positioned at an interior of the pocket, the second material protruding through one or more apertures in the base portion and the first material forming the exterior surface thereof so that portions of the second material protrude from the interior of the pocket to the exterior surface of the base portion through the one or more apertures in the base portion, and protrude outward past the first material from the one or more apertures in the base portion forming the exterior surface of the base portion such that when the base portion of the case is placed on a support surface, the second material protruding through the one or more apertures contacts the support surface;
   wherein the second material has a higher coefficient of friction than the first material and is secured to the base portion,
   wherein the second material protruding through the one or more apertures in the base portion extends away from each of the one or more apertures along both opposing surfaces of the first material forming the exterior surface of the base portion and the interior of the base portion to create interlock connections between the second material and the base portion that secure the second material to the base portion, wherein the first material and the second material are molded to each other, and wherein the second material protruding through the one or more apertures protrudes through adjacent apertures in the first material, and extends between the adjacent apertures on both opposing surfaces of the first material.

2. The case according to claim 1, wherein the first material is shaped with a gap at one or more regions thereof, wherein the second material fills the gap and protrudes therefrom.

3. The case according to claim 2, wherein the gap in the first material is formed at a corner region of the case.

4. The case according to claim 1, wherein the first material is shaped as a preform member prior to the second material being applied thereto.

5. The case according to claim 4, wherein the second material is over-molded onto the preform.

6. The case according to claim 1, wherein the first material and the second material are molded together.

7. The case according to claim 6, wherein the first material and the second material are integrally molded so that the case forms an integral unit.

8. The case according to claim 7, wherein the first material and the second material are molded together through co-injection molding.

9. The case according to claim 1, wherein the second material is bonded to the first material or is secured to the first material via an adhesive.

10. The case according to claim 1, wherein the second material is configured to surround the portable electronic device at an interior of the first material.

11. The case according to claim 1, wherein the second material is configured to frame a front portion of the portable electronic device.

12. The case according to claim 1, wherein the case is separable into constituent parts configured to slide relative to each other to surround the portable electronic device.

13. The case according to claim 1, wherein the first material of the base portion has a flat configuration.

14. The case according to claim 1, wherein the second material protrudes from the first material at the side portions of the portable electronic device.

15. The case according to claim 1, wherein the first material comprises one or more of plastic, polycarbonate, wood, metal, glass, and leather.

16. The case according to claim 1, wherein the second material is formed from thermoplastic polyethylene (TPE), rubber, or form.

17. The case according to claim 1, wherein exterior surfaces formed in the first material generally match contours of surfaces of the portable electronic device.

18. The case of claim 1, wherein the first material is glossier than the second material.

19. The case of claim 1, wherein the second material has a greater resiliency than the first material.

20. The case of claim 1, further comprising one or more apertures formed in one or more of the first material and the second material, configured to align with features of the portable electronic device.

21. The case of claim 1, wherein the second material protruding through the one or more apertures in the first material protrudes through a plurality of sets of said adjacent apertures in the first material and extends between the adjacent apertures of each set on both opposing surfaces of the first material.

22. The case according to claim 1, wherein the second material is molded onto the first material.

23. The case according to claim 1, wherein the first material and the second material are molded to each other through co-injection molding.

24. The case according to claim 1, wherein the second material is over-molded onto the first material.

25. The case according to claim 1, wherein the first material and the second material are molded to each other through over-molding.

* * * * *